(12) United States Patent
Marsh et al.

(10) Patent No.: US 7,364,524 B2
(45) Date of Patent: Apr. 29, 2008

(54) DRIVELINE COUPLING FOR ELECTRIC MODULE

(75) Inventors: Gregory A. Marsh, Ferndale, MI (US); Robert J. Degowske, Fair Haven, MI (US); Zugang Huang, Troy, MI (US)

(73) Assignee: American Axel & Manufacturing, Inc., Detroit, MI (US)

( * ) Notice: Subject to any disclaimer, the term of this patent is extended or adjusted under 35 U.S.C. 154(b) by 69 days.

(21) Appl. No.: 11/415,480

(22) Filed: May 1, 2006

(65) Prior Publication Data
US 2007/0254765 A1 Nov. 1, 2007

(51) Int. Cl.
*F16H 37/06* (2006.01)

(52) U.S. Cl. .................... 475/5; 475/149; 475/150; 475/152; 475/153; 180/65.2; 192/43; 192/54.1; 192/66.2; 192/94; 192/103 C

(58) Field of Classification Search ............ None
See application file for complete search history.

(56) References Cited

U.S. PATENT DOCUMENTS

| | | |
|---|---|---|
| 779,351 A | 1/1905 | Douglas |
| 1,481,405 A | 1/1924 | Anglada |
| 1,849,755 A | 3/1932 | Fielder |
| 1,900,470 A | 3/1933 | Smith |
| 1,923,225 A | 8/1933 | Moorhouse |
| 1,927,509 A | 9/1933 | Waterhouse |
| 2,244,875 A | 6/1941 | Framhein |
| 2,258,328 A | 10/1941 | Lee et al. |
| 2,329,060 A | 9/1943 | Knoblock |
| 2,364,019 A | 11/1944 | Beall |
| 2,514,228 A | 7/1950 | Dodge |
| 2,681,718 A | 6/1954 | Stoner |
| 2,729,298 A | 1/1956 | Tourneau |
| 2,746,585 A | 5/1956 | Binder |
| 3,059,712 A | 10/1962 | Hautau |
| 3,265,147 A | 8/1966 | Coordes |
| 3,267,311 A | 8/1966 | Lamparty |
| 3,297,926 A | 1/1967 | Campbell et al. |
| 3,469,646 A | 9/1969 | O'Connor |
| 3,567,000 A | 3/1971 | Richards |
| 3,804,222 A | 4/1974 | Reams |
| 4,042,056 A | 8/1977 | Horwinski |
| 4,046,240 A | 9/1977 | Schlagmuller et al. |
| 4,089,384 A | 5/1978 | Ehrenberg |

(Continued)

*Primary Examiner*—David D. Le
(74) *Attorney, Agent, or Firm*—Harness, Dickey & Pierce, P.L.C.

(57) ABSTRACT

A module with an axle assembly, which has a housing, a differential, an input shaft, a pair of shafts and a pair of wheel hubs, and an auxiliary drive unit that includes an electric motor and an overrunning clutch. The differential and the input shaft are disposed in the housing for rotation therein. The differential includes a case and a ring gear that is coupled to the case. The input shaft has a pinion that is meshingly engaged to the ring gear. Each shaft couples the differential to one of the wheel hubs. The overrunning clutch includes an input portion, which is coupled to the output shaft of the electric motor, and an output portion, which is coupled to the input shaft. The output portion is de-coupled from the input portion when a rotational speed of the input portion is not greater than a rotational speed of the output portion.

20 Claims, 3 Drawing Sheets

U.S. PATENT DOCUMENTS

| | | | |
|---|---|---|---|
| 4,261,452 A | 4/1981 | Barrows | |
| 4,282,959 A | 8/1981 | Schachner | |
| 4,401,182 A | 8/1983 | Pollman | |
| 4,433,766 A | 2/1984 | Teraoka | |
| 4,438,342 A * | 3/1984 | Kenyon | 290/45 |
| 4,533,011 A | 8/1985 | Heidemeyer et al. | |
| 4,570,741 A | 2/1986 | McCoy | |
| 4,673,073 A | 6/1987 | Weatherby | |
| 4,687,085 A | 8/1987 | Shimizu et al. | |
| 4,913,258 A | 4/1990 | Sakurai et al. | |
| 4,930,590 A | 6/1990 | Love et al. | |
| 5,165,510 A | 11/1992 | Lunati | |
| 5,224,563 A | 7/1993 | Iizuka et al. | |
| 5,365,431 A | 11/1994 | Minezawa et al. | |
| 5,418,437 A | 5/1995 | Couture et al. | |
| 5,419,406 A | 5/1995 | Kawamoto et al. | |
| 5,428,274 A | 6/1995 | Furutani et al. | |
| 5,453,930 A | 9/1995 | Imaseki et al. | |
| 5,503,261 A | 4/1996 | Schultz | |
| 5,507,374 A | 4/1996 | Rude | |
| 5,635,805 A | 6/1997 | Ibaraki et al. | |
| 5,722,502 A | 3/1998 | Kubo | |
| 5,733,217 A | 3/1998 | Naraki et al. | |
| 5,786,640 A | 7/1998 | Sakai et al. | |
| 5,788,003 A | 8/1998 | Spiers | |
| 5,879,265 A | 3/1999 | Bek et al. | |
| 5,921,338 A | 7/1999 | Edmondson | |
| 5,924,504 A | 7/1999 | Ruppert, Jr. et al. | |
| 5,927,455 A | 7/1999 | Baker et al. | |
| 5,992,592 A | 11/1999 | Schowalter | |
| 6,000,512 A | 12/1999 | Cronin et al. | |
| 6,008,606 A | 12/1999 | Arai et al. | |
| 6,024,182 A | 2/2000 | Hamada et al. | |
| 6,176,359 B1 | 1/2001 | Krisher | |
| 6,276,474 B1 | 8/2001 | Ruppert et al. | |
| 6,326,702 B1 | 12/2001 | Yonekura et al. | |
| 6,333,620 B1 | 12/2001 | Schmitz et al. | |
| 6,336,537 B1 | 1/2002 | Krisher et al. | |
| 6,341,660 B1 | 1/2002 | Schiller et al. | |
| 6,524,215 B1 | 2/2003 | Schmidt | |
| 6,524,217 B1 * | 2/2003 | Murakami et al. | 477/5 |
| 6,557,677 B2 | 5/2003 | Peura | |
| 6,595,337 B2 | 7/2003 | Goto et al. | |
| 6,629,590 B2 | 10/2003 | Ochab et al. | |
| 6,655,515 B2 | 12/2003 | Cox et al. | |
| 6,688,412 B2 | 2/2004 | Kima et al. | |
| 6,691,809 B2 | 2/2004 | Hata et al. | |
| 6,722,484 B2 | 4/2004 | Ochab et al. | |
| 6,739,440 B1 | 5/2004 | Dick | |
| 6,745,880 B1 | 6/2004 | Yuergens | |
| 6,770,005 B2 * | 8/2004 | Aikawa et al. | 475/5 |
| 6,808,033 B2 | 10/2004 | Dare-Bryan et al. | |
| 6,814,201 B2 | 11/2004 | Thomas | |
| 6,817,432 B2 | 11/2004 | Kitada et al. | |
| 6,817,457 B2 | 11/2004 | Monahan et al. | |
| 6,832,674 B2 | 12/2004 | Blair et al. | |
| 6,846,257 B2 | 1/2005 | Baker et al. | |
| 6,849,017 B2 | 2/2005 | Nett et al. | |
| 6,880,654 B2 | 4/2005 | Plishner | |
| 6,886,675 B2 | 5/2005 | Raber et al. | |
| 7,017,542 B2 | 3/2006 | Wilton et al. | |
| 7,028,583 B2 | 4/2006 | Bennett | |
| 7,108,087 B2 | 9/2006 | Imai | |
| 7,165,640 B2 | 1/2007 | Laurent et al. | |
| 2001/0004948 A1 | 6/2001 | Ruppert et al. | |
| 2003/0019675 A1 | 1/2003 | Haas et al. | |
| 2003/0111280 A1 | 6/2003 | Platner et al. | |
| 2003/0183467 A1 * | 10/2003 | Kozarekar | 188/380 |
| 2003/0183477 A1 | 10/2003 | Chevalier | |
| 2004/0112656 A1 | 6/2004 | Bowen | |
| 2005/0023056 A1 | 2/2005 | Harrup et al. | |
| 2005/0056471 A1 | 3/2005 | Kurata | |
| 2005/0161948 A1 | 7/2005 | Yang | |
| 2005/0224264 A1 | 10/2005 | Perrin | |
| 2006/0047398 A1 * | 3/2006 | Abe et al. | 701/69 |
| 2006/0180366 A1 | 8/2006 | Brill et al. | |
| 2006/0201725 A1 | 9/2006 | Kano et al. | |
| 2006/0225930 A1 | 10/2006 | Schulte | |

* cited by examiner

DRIVELINE COUPLING FOR ELECTRIC MODULE

INTRODUCTION

The present disclosure generally relates to vehicle drive trains and more particularly to a vehicle drive train having a secondary power source, such as one or more electric motors, for providing part-time all-wheel drive capability.

It is known in the art to provide an all-wheel drive vehicle drive train that provides drive torque to the front and rear wheels of a vehicle on either a full-time basis or a part-time but automatically-engaging basis. The known full-time all-wheel drive configurations typically utilize a transfer case or power transfer unit and a center differential or coupling to distribute drive torque to a front differential, which in turn distributes drive torque to the set of front wheels, and a rear differential, which in turn distributes drive torque to the set of rear wheels. The known part-time all-wheel drive configurations typically utilize a power transmitting coupling that permits a set of wheels (e.g., the rear wheels) to coast until the other set of wheels (e.g., the front set of wheels) begins to loose traction.

One drawback of these all-wheel drive arrangements concerns their complexity and overall cost. Not only are the components of the all-wheel drive system relatively complex and costly to manufacture and install, the associated vehicle architecture is frequently more complex due to the common practice of vehicle manufacturers to offer vehicles with a standard two-wheel configuration and an optional all-wheel drive configuration. In this regard, it is frequently necessary to modify the vehicle fuel tank and/or relocate the spare tire of the vehicle to incorporate a conventional four-wheel drive system into a two-wheel drive vehicle.

One proposed solution involves the use of wheel hub motors. In these systems, relatively large electric motors are placed within the circumference of two or more of the vehicle wheels. As wheel hub motors are relatively large in diameter, the size of the wheel tends to be relatively large (i.e., 18 inches or greater). Consequently, wheel hub motors may not be practical as when a relatively small wheel size is employed or where packaging issues, such as the size and location of a fuel tank or the location of a spare tire, prevent a wheel hub motor from being integrated into the vehicle.

In view of the above discussion, it will be apparent that it has heretofore been impractical to offer an all-wheel drive system in a relatively inexpensive vehicle platform. Accordingly, there remains a need in the art for an improved vehicle drive train that permits a vehicle to be equipped with all-wheel drive in a manner that is relatively inexpensive.

SUMMARY

In one form, the present teachings provide a drive train module for a vehicle that includes an axle assembly and an auxiliary drive unit. The axle assembly has a housing, a differential unit, an input shaft, a pair of shafts and a pair of wheel hubs. The differential unit and the input shaft are disposed in the housing for rotation therein. The differential unit includes a case and a ring gear that is coupled to the case. The input shaft has a pinion that is meshingly engaged to the ring gear. Each shaft couples the differential unit to an associated one of the wheel hubs. The auxiliary drive has an electric motor and an overrunning clutch. The overrunning clutch includes an input portion, which is coupled to the output shaft of the electric motor, and an output portion, which is coupled to the input shaft. The output portion is de-coupled from the input portion when a rotational speed of the input portion is not greater than a rotational speed of the output portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
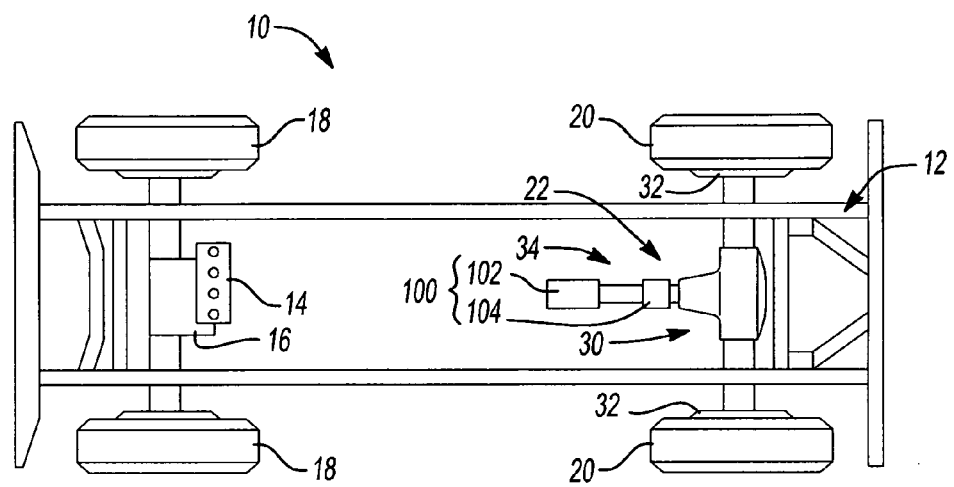
FIG. 1 is a schematic illustration of an exemplary vehicle having an auxiliary drive system constructed in accordance with the teachings of the present disclosure.

With reference to FIG. 1 of the drawings, a vehicle constructed in accordance with the teachings of the present disclosure is generally indicated by reference numeral 10. The vehicle 10 can include a body 12 to which an engine 14, a transmission 16, a set of front wheels 18, a set of rear wheels 20 and a rear drive train module 22 can be coupled. In the particular example provided, the engine 14 and transmission 16 cooperate to provide drive torque to the set of front wheels 18. The rear drive train module 22 can include an axle assembly 30, a pair of wheel hubs 32, which are coupled to respective ones of the rear wheels 20, and an auxiliary drive system 34.

Figure 2:
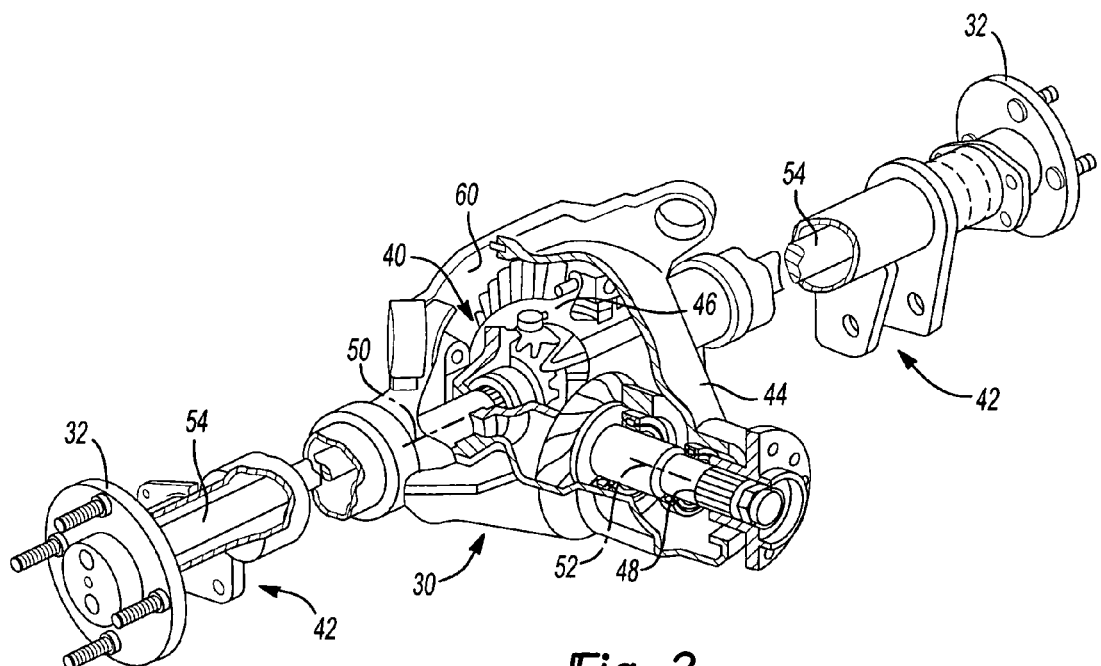
FIG. 2 is a perspective view in partial section of a portion of the auxiliary drive system of FIG. 1.

In FIG. 2, the axle assembly 30 can be configured in a conventional manner and can include a differential assembly 40 and a pair of axle shaft assemblies 42. The differential assembly 40 can include a housing 44, a differential unit 46 and an input shaft assembly 48. The housing 44 can support the differential unit 46 for rotation about a first axis 50 and can further support the input shaft assembly 48 for rotation about a second axis 52 that is perpendicular to the first axis 50. Each axle shaft assembly 42 can include an axle half-shaft 54 that can be coupled to an associated wheel hub 32 for rotation about the first axis 50.

Figure 3:
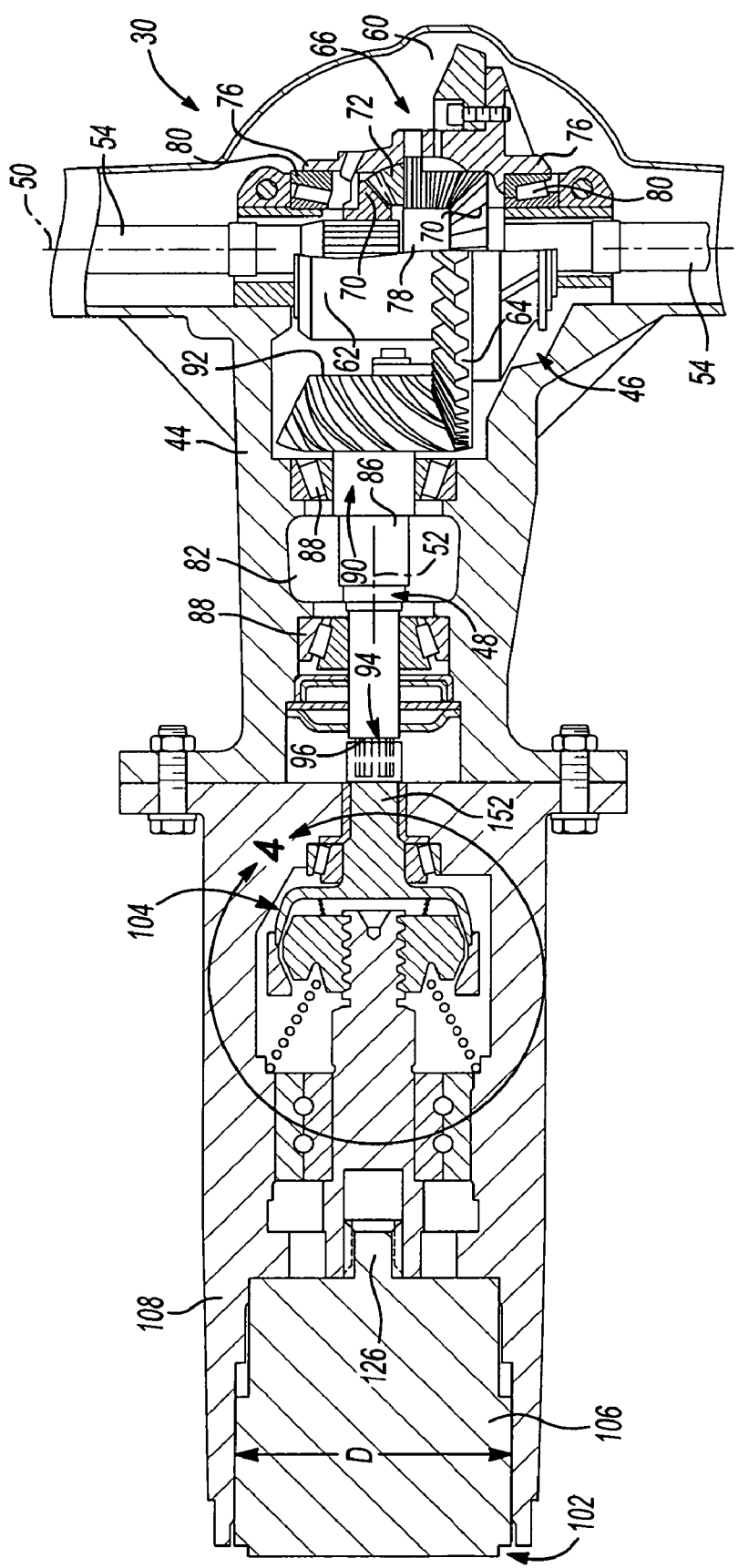
FIG. 3 is a longitudinal section view of a portion of the auxiliary drive system of FIG. 1.

With additional reference to FIG. 3, the differential unit 46 can be disposed within a central cavity 60 that is defined by the housing 44 and can include a case 62, a ring gear 64 that can be fixed for rotation with the case 62, and a gearset 66 that can be disposed within the case 62. The gearset 66 can include a pair of side gears 70 and a plurality of differential pinions 72, which are rotatably supported in the case 62. The case 62 can include a pair of trunnions 76 and a gear cavity 78. A pair of bearing assemblies 80 can be employed to support the trunnions 76 for rotation about the first axis 50. Each axle half shaft 54 can extend through an aperture (not specifically shown) in the housing 44 and can be coupled for rotation about the first axis 50 with an associated one of the side gears 70. The case 62 can be employed to support the plurality of differential pinions 72 for rotation within the gear cavity 78 about one or more axes that are perpendicular to the first axis 50. The side gears 70 each include a plurality of teeth (not specifically shown) which meshingly engage teeth (not specifically shown) that are formed on the differential pinions 72.

The input shaft assembly 48 can extend through an input shaft aperture 82 in the housing 44 and can include an input pinion shaft 86 and a pair of conventional bearing assemblies 88 that cooperate with the housing 44 to support the input pinion shaft 86 for rotation on the second axis 52. The input pinion shaft 86 can include a stem portion 90 and a gear 92 that are fixedly coupled to one another. The gear 92 is configured to meshingly engage with the ring gear 64 to transmit rotary power thereto. The stem portion 90 can include a coupling portion 94, which includes a splined end section 96 in the example provided.

The auxiliary drive system 34 can include a drive unit 100 with a motor assembly 102 and a clutch 104. The motor assembly 102 can include an electric motor 106 and a mounting bracket 108 that can couple the electric motor 106 to the housing 44 of the differential assembly 40. The electric motor 106 can be a low voltage (i.e., <50 volts) electric motor, such as a brush-type direct current (DC) motor or a SepEx® motor, and can have an outer diameter D that is less than 8 inches and more preferably, less than about 6 inches. The electric motor 106 can have a maximum sustained torque of at least about 30 ft.-lbs. and more preferably a maximum sustained torque of about 40 ft.-lbs. to about 50 ft.-lbs.

Figure 4:
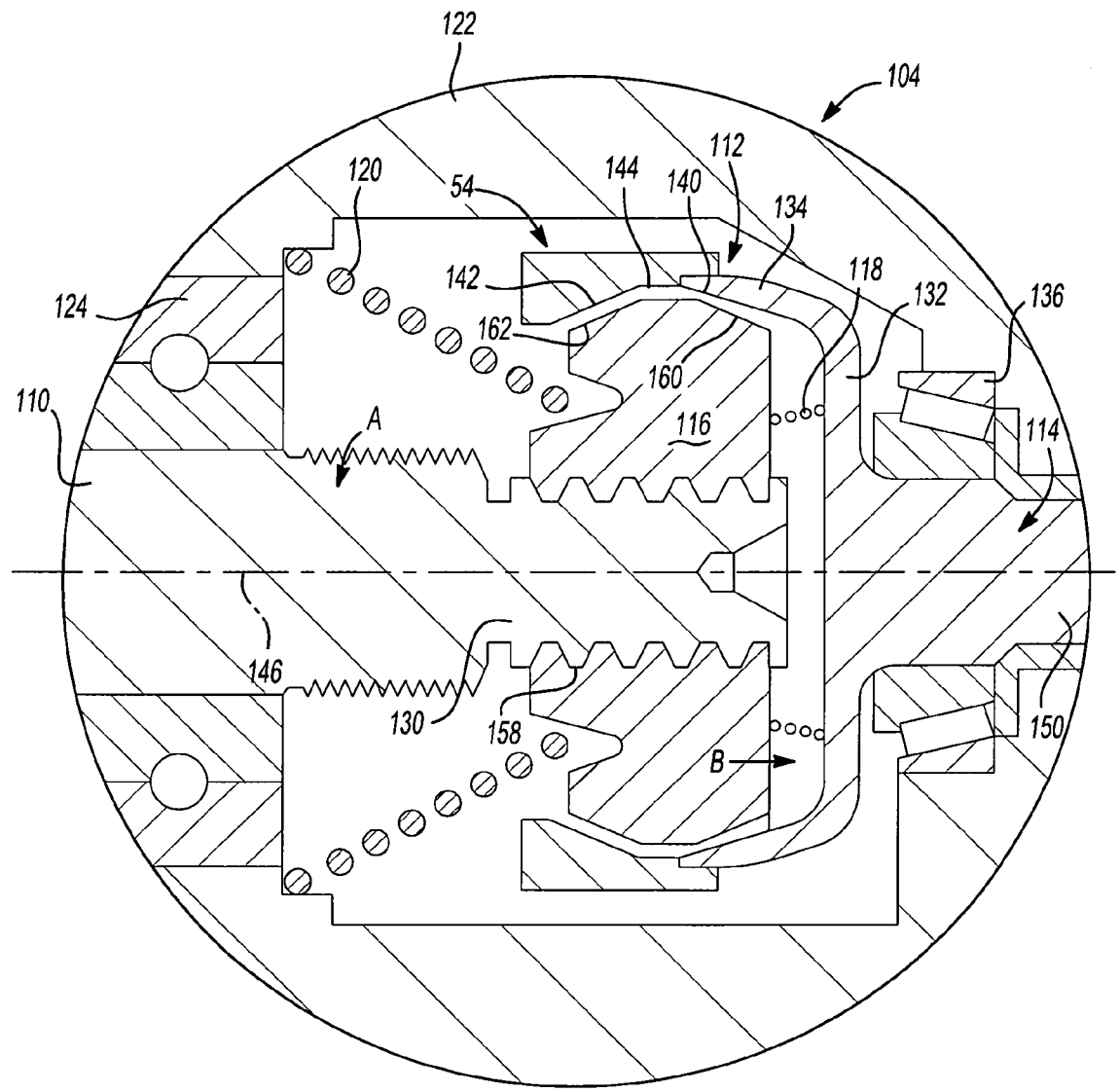
FIG. 4 is an enlarged portion of FIG. 3 illustrating the clutch in more detail.

The clutch can be any appropriate type of clutch, including an overrunning clutch, a slip clutch or a clutch having an inertia disk, actuator and pressure plates (e.g., a wet clutch). Moreover, it will be appreciated that the clutch could be actuated through various mechanical, hydraulic and/or electrical means. With reference to FIG. 4, the clutch 104 can be an overrunning clutch and can include an input portion or shaft 110, an outer cone structure 112, an output portion or shaft 114, an inner cone structure 116 and first and second biasing springs 118 and 120, respectively. The input shaft 110 can be supported for rotation within a clutch housing 122 by a pair of first bearings 124 and can be coupled for rotation with the output shaft 126 of the electric motor 106. Optionally, a gear reduction may be disposed between the output shaft 126 of the electric motor 106 and the input shaft 110 of the clutch 104. The input shaft 110 can include a threaded portion 130 that can be formed with any appropriate thread form, such as an Acme or square thread.

The outer cone structure 112 can be generally cup-shaped with a hub portion 132 and an annular wall 134. A second bearing 136 can be employed to mount the outer cone structure 112 to the clutch housing 122 such that the annular wall 134 is rotatably disposed about the threaded portion 130 of the input shaft 110. The annular wall 134 can include first and second interfaces 140 and 142, respectively, that are disposed on opposite axial sides of a rest zone 144. The first interface 140 tapers inwardly toward the rotational center line 146 of the outer cone structure 112 as one traverses the profile of the first interface 140 from a first point, which can be located adjacent the rest zone 144, to a second point that can be located proximate the hub portion 132. Stated another way, the first interface 140 can have a shape that corresponds to the exterior surface of a frustum.

It will be appreciated that the second interface 142 can be constructed as a mirror image of the first interface 140, as is illustrated in the particular example provided. Accordingly, a detailed discussion of the second interface 142 need not be provided herein. It will also be appreciated that the second interface 142 could be constructed somewhat differently than the first interface 140 so as to provide different locking characteristics depending upon the rotational direction of the input to the clutch 104. For example, the angle of the cone that defines the second interface 142 could be different than the angle of the cone that defines the first interface 140.

The output shaft 114 can be coupled for rotation with the outer cone structure 112. In the particular example provided, the output shaft 114 includes a cylindrically-shaped shank portion 150 that can be unitarily formed with a portion of the outer cone structure 112. Moreover, the output shaft 114 can be coupled for rotation with the stem portion 90 of the input pinion shaft 86. In the particular example provided, the shank portion 150 includes a female splined portion 152 that is configured to engage the splined end section 96.

The inner cone structure 116 can have an internally threaded aperture 158 and first and second mating interfaces 160 and 162, respectively. The internally threaded aperture 158 can have a thread form that threadably engages the threaded portion 130 of the input shaft 110 so that rotation of the input shaft 110 relative to the inner cone structure 116 will cause the inner cone structure 116 to translate along a rotational axis of the input shaft 110. The first and second mating interfaces 160 and 162 can be configured to matingly engage the first and second interfaces 140 and 142, respectively. In this regard, the first mating interface 160 can have a shape that can be configured to matingly engage the first interface 140, while the second mating interface 162 can have a shape that can be configured to matingly engage the second interface 142.

The first and second biasing springs 118 and 120 cooperate to bias the inner cone structure 116 into a position relative to the rest zone 144 such that the first and second mating interfaces 160 and 162 are spaced apart from the first and second interfaces 140 and 142, respectively. The first and second biasing springs 118 and 120 can be any type of resilient device, but in the particular embodiment illustrated, are helical compression-type springs. In the particular example provided, the first biasing spring 118 is disposed between the hub portion 132 and a first axial end of the inner cone structure 116, while the second biasing spring 120 is disposed between the clutch housing 122 and a second axial end of the inner cone structure 116 that is opposite the first axial end.

In situations where the input shaft 110 is rotating at a speed that is less than a rotational speed of the outer cone structure 112, the inner cone structure 116 will be biased into a neutral position (shown in FIG. 4) by the first and second biasing springs 118 and 120 so that the first and second mating interfaces 160 and 162 are spaced apart from the first and second interfaces 140 and 142, respectively. In this condition, drive torque cannot be transmitted between the inner cone structure 116 and the outer cone structure 112. Accordingly, the electric motor 106 cannot be back-driven by the rotation of the rear wheels 20 (FIG. 1).

In situations where the input shaft is rotating at a speed that is greater than a rotational speed of the outer cone structure 112, the inner cone structure 116 will rotate about the threaded portion 130 of the input shaft 110 and translate toward one of the first and second interfaces 140 and 142 depending upon the direction in which the input shaft 110 is rotating. Contact between an interface and a mating interface will effectively lock the inner cone structure 116 to the outer cone structure 112 to permit torque to be transmitted therebetween. Accordingly, drive torque generated by the electric motor 106 can be transmitted to the axle assembly 30 (FIG. 1) to aid in the propulsion of the vehicle 10 (FIG. 1).

For example, rotation of the input shaft 110 in the direction of arrow A at a rotational speed that exceeds the rotational speed of the outer cone structure 112 will cause the inner cone structure 116 to translate in the direction of arrow B so that the first mating interface 160 engages the first interface 140. Similarly, rotation of the input shaft 110 in a direction opposite that of arrow A at a rotational speed that exceeds the rotational speed of the outer cone structure 112 will cause the inner cone structure 116 to translate in a direction opposite that of arrow B so that the second mating interface 162 engages the second interface 142.

As will be appreciated, the first and second biasing springs 118 and 120 can cooperate to disengage the inner cone structure 116 from the outer cone structure 112 in situations where the inner cone structure 116 decelerates so that it has a rotational speed that is less than that of the outer cone structure 112.

While specific examples have been described in the specification and illustrated in the drawings, it will be understood by those of ordinary skill in the art that various changes may be made and equivalents may be substituted for elements thereof without departing from the scope of the present disclosure as defined in the claims. For example, it will be appreciated from this disclosure that the electric motor 106 could be an AC induction motor and/or that the clutch 104 could be any appropriate type of clutch, such as a slip clutch, or could be omitted altogether. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A drive train module for a vehicle comprising:
   an axle assembly having a housing, a differential unit, an input shaft, a pair of drive shafts and a pair of wheel hubs, the differential unit disposed in the housing for rotation about a differential axis, the input shaft being disposed in the housing for rotation about an input shaft axis that is transverse to the differential axis, the differential unit including a case and a bevel ring gear that is coupled to the case, the input shaft having a bevel pinion that is meshingly engaged to the bevel ring gear, each drive shaft coupling the differential unit to an associated one of the wheel hubs; and
   an auxiliary drive having an electric motor and an overrunning clutch, the electric motor having an output shaft that is coaxial with the input shaft, the overrunning clutch including an input portion, which is coupled to the output shaft, and an output portion, which is coupled to the input shaft, the output portion being de-coupled from the input portion when a rotational speed of the input portion is not greater than a rotational speed of the output portion.

2. The drive train module of claim 1, wherein a maximum sustained torque of an output of the electric motor is less than about 50 ft-lbs.

3. The drive train module of claim 1, wherein the auxiliary drive includes a housing that is fixedly but removably coupled to the housing of the axle assembly.

4. The drive train module of claim 1, wherein the electric motor has an outer diameter that is less than about 8 inches.

5. The drive train module of claim 4, wherein the outer diameter is less than about 6 inches.

6. The drive train module of claim 1, wherein the input portion of the clutch includes an inner cone structure and the output portion of the clutch includes an outer cone structure and wherein the inner cone structure translates to engage the outer cone structure when the rotational speed of the inner cone structure exceeds the rotational speed of the outer cone structure.

7. The drive train module of claim 6, wherein the outer cone structure includes first and second interfaces, wherein the inner cone structure includes first and second mating interfaces, wherein the first mating interface engages the first interface when the inner and outer cone structures rotate in a first direction and wherein the second mating interface engages the second interface when the inner and outer cone structures rotate in a second direction opposite the first direction.

8. The drive train module of claim 7, wherein a rest area is formed on the outer cone structure between the first and second interfaces, the rest area being operable for axially spacing the first and second interfaces apart from one another, and wherein the inner cone structure is biased into the rest area.

9. A drive train module for a vehicle comprising:
   an axle assembly having a housing, a differential unit, an input shaft, a pair of drive shafts and a pair of wheel hubs, the differential unit disposed in the housing for rotation about a differential axis, the input shaft being disposed in the housing for rotation about an input shaft axis that is transverse to the differential axis, the differential unit including a case and a bevel ring gear that is coupled to the case, the input shaft having a bevel pinion that is meshingly engaged to the bevel ring gear, each drive shaft coupling the differential unit to an associated one of the wheel hubs; and
   an auxiliary drive having an electric motor and an overrunning clutch, the electric motor having an outer diameter that is less than about 8 inches in diameter and being capable of providing a sustained rotary output that is less than or equal to about 50 ft-lbs, the electric motor having an output shaft that is coaxial with the input shaft, the overrunning clutch having a first portion, which is coupled to the output shaft, and a second portion, which is coupled to the input shaft.

10. The drive train module of claim 9, wherein the outer diameter is less than about 6 inches.

11. The drive train module of claim 9, wherein the auxiliary drive includes a housing that is fixedly but removably coupled to the housing of the axle assembly.

12. The drive train module of claim 9, wherein the first portion of the clutch includes an inner cone structure and the second portion of the clutch includes an outer cone structure and wherein the inner cone structure translates to engage the outer cone structure when a rotational speed of the inner cone structure exceeds a rotational speed of the outer cone structure.

13. The drive train module of claim 12, wherein the outer cone structure includes first and second interfaces, wherein the inner cone structure includes first and second mating interfaces, wherein the first mating interface engages the first interface when the inner and outer cone structures rotate in a first direction and wherein the second mating interface engages the second interface when the inner and outer cone structures rotate in a second direction opposite the first direction.

14. The drive train module of claim 13, wherein a rest area is formed on the outer cone structure between the first and second interfaces, the rest area being operable for axially spacing the first and second interfaces apart from one another, and wherein the inner cone structure is biased into the rest area.

15. A drive train module for a vehicle comprising:
an axle assembly having a housing, a differential unit, an input shaft, a pair of drive shafts and a pair of wheel hubs, the differential unit and the input shaft being disposed in the housing for rotation therein, the differential unit including a case and a ring gear that is coupled to the case, the input shaft having a pinion that is meshingly engaged to the ring gear, each drive shaft coupling the differential unit to an associated one of the wheel hubs; and
an auxiliary drive having an electric motor and an overrunning clutch, the electric motor having an output shaft, the overrunning clutch including an input portion, which is coupled to the output shaft, and an output portion, which is coupled to the input shaft, the output portion being de-coupled from the input portion when a rotational speed of the input portion is not greater than a rotational speed of the output portion;
wherein the input portion of the clutch includes an inner cone structure and the output portion of the clutch includes an outer cone structure and wherein the inner cone structure translates to engage the outer cone structure when the rotational speed of the inner cone structure exceeds the rotational speed of the outer cone structure.

16. The drive train module of claim 15, wherein the outer cone structure includes first and second interfaces, wherein the inner cone structure includes first and second mating interfaces, wherein the first mating interface engages the first interface when the inner and outer cone structures rotate in a first direction and wherein the second mating interface engages the second interface when the inner and outer cone structures rotate in a second direction opposite the first direction.

17. The drive train module of claim 16, wherein a rest area is formed on the outer cone structure between the first and second interfaces, the rest area being operable for axially spacing the first and second interfaces apart from one another, and wherein the inner cone structure is biased into the rest area.

18. A drive train module for a vehicle comprising:
an axle assembly having a housing, a differential unit, an input shaft, a pair of drive shafts and a pair of wheel hubs, the differential unit and the input shaft being disposed in the housing for rotation therein, the differential unit including a case and a ring gear that is coupled to the case, the input shaft having a pinion that is meshingly engaged to the ring gear, each drive shaft coupling the differential unit to an associated one of the wheel hubs; and
an auxiliary drive having an electric motor and an overrunning clutch, the electric motor having an outer diameter that is less than about 8 inches in diameter and being capable of providing a sustained rotary output that is less than or equal to about 50 ft-lbs. the electric motor having an output shaft, the overrunning clutch having a first portion, which is coupled to the output shaft, and a second portion, which is coupled to the input shaft;
wherein the first portion of the clutch includes an inner cone structure and the second portion of the clutch includes an outer cone structure and wherein the inner cone structure translates to engage the outer cone structure when a rotational speed of the inner cone structure exceeds a rotational speed of the outer cone structure.

19. The drive train module of claim 18, wherein the outer cone structure includes first and second interfaces, wherein the inner cone structure includes first and second mating interfaces, wherein the first mating interface engages the first interface when the inner and outer cone structures rotate in a first direction and wherein the second mating interface engages the second interface when the inner and outer cone structures rotate in a second direction opposite the first direction.

20. The drive train module of claim 19, wherein a rest area is formed on the outer cone structure between the first and second interfaces, the rest area being operable for axially spacing the first and second interfaces apart from one another, and wherein the inner cone structure is biased into the rest area.

* * * * *